United States Patent
Kitani (10) Patent No.: US 10,740,909 B2
(45) Date of Patent: Aug. 11, 2020

(54) DRIVE RECORDER

(71) Applicant: DENSO CORPORATION, Kariya, Aichi-pref. (JP)

(72) Inventor: Hiroki Kitani, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/087,033

(22) PCT Filed: Mar. 22, 2017

(86) PCT No.: PCT/JP2017/011497
§ 371 (c)(1),
(2) Date: Sep. 20, 2018

(87) PCT Pub. No.: WO2017/164244
PCT Pub. Date: Sep. 28, 2017

(65) Prior Publication Data
US 2019/0102892 A1 Apr. 4, 2019

(30) Foreign Application Priority Data
Mar. 22, 2016 (JP) .................................. 2016-056974

(51) Int. Cl.
*G06T 7/292* (2017.01)
*G08G 1/00* (2006.01)
*H04N 7/18* (2006.01)
*B60R 1/00* (2006.01)
*G07C 5/08* (2006.01)

(52) U.S. Cl.
CPC .............. *G06T 7/292* (2017.01); *B60R 1/002* (2013.01); *B60R 1/006* (2013.01); *G07C 5/0866* (2013.01); *G08G 1/00* (2013.01); *H04N 7/181* (2013.01); *H04N 7/188* (2013.01); *B60R 2300/105* (2013.01); *G06T 2207/30252* (2013.01)

(58) Field of Classification Search
None
See application file for complete search history.

(56) References Cited

U.S. PATENT DOCUMENTS

2013/0208119 A1\* 8/2013 Tseng .................... H04N 7/18
348/148

FOREIGN PATENT DOCUMENTS

CN 1866300 A 11/2006
JP 2002/218450 8/2002
(Continued)

*Primary Examiner* — Dakshesh D Parikh
(74) *Attorney, Agent, or Firm* — Maschoff Brennan (57) ABSTRACT

A drive recorder is provided with a moving object detecting unit and a temporary recording control unit. A moving object detecting unit detects a moving object in a captured image acquired by an image acquiring unit mounted on the own vehicle and provided with a plurality of cameras capturing images around the own vehicle. A temporary recording control unit selects, as a temporary recording camera, one or more cameras which are included in the plurality of cameras in the image acquiring unit and which include a target camera which is a camera including the position of the moving object within an image capturing range of the camera, according to a detection result from the moving object detecting unit, and to record an image captured by the temporary recording camera in a previously prepared recording medium.

10 Claims, 6 Drawing Sheets

(56) References Cited

FOREIGN PATENT DOCUMENTS

| JP | 2002-218450 A | | 8/2002 | |
|---|---|---|---|---|
| JP | 2002218450 A | * | 8/2002 | ............... H04N 7/18 |
| JP | 2004-128899 A | | 4/2004 | |
| JP | 2009/230343 | | 10/2009 | |
| JP | 2009-230343 A | | 10/2009 | |
| JP | 2009/280109 | | 12/2009 | |
| JP | 2009-280109 A | | 12/2009 | |
| JP | 3182941 U | | 4/2013 | |

* cited by examiner

|   | FRONT | LEFT SIDE | REAR | RIGHT SIDE |
|---|---|---|---|---|
| A | ○ | ○ | — | — |
| B | ○ | ○ | — | ○ |
| C | ○ | — | — | ○ |
| D | ○ | ○ | ○ | — |
| E | ○ | — | ○ | ○ |
| F | — | ○ | ○ | — |
| G | — | ○ | ○ | ○ |
| H | — | — | ○ | ○ |

FIG.6

|   | FRONT | LEFT SIDE | REAR | RIGHT SIDE |
|---|---|---|---|---|
| A | ○ | ○ | — | — |
| B | ○ | — | — | — |
| C | ○ | — | — | ○ |
| D | — | ○ | — | — |
| E | — | — | — | ○ |
| F | — | ○ | ○ | — |
| G | — | — | ○ | — |
| H | — | — | ○ | ○ |

DRIVE RECORDER

CROSS-REFERENCE TO RELATED APPLICATION

This application is the U.S. national phase of International Application No. PCT/JP2017/011497 filed Mar. 22, 2017 which designated the U.S. and claims priority to Japanese Patent Application No. 2016-56974 filed Mar. 22, 2016, the contents of which are incorporated herein by reference.

TECHNICAL FIELD

The present disclosure relates to a drive recorder which records images around a vehicle.

BACKGROUND ART

Drive recorders are known that record images acquired from vehicle-mounted cameras. For these drive recorders, a period during which images can be saved is limited by the capacity of memory available for recording images. This period decreases with increasing number of cameras intended for the recording.

PTL 1, for example, describes a technique for preventing unwanted images from being recorded in the memory. According to PTL 1, when a vehicle is parked or stopped and its engine is turned off, the drive recorder enters a monitor mode in which the surroundings are monitored for obstacles approaching or coming into contact with the vehicle. In the monitor mode, when an ultrasonic sensor detects an obstacle within a predetermined range, the drive recorder starts recording images from the vehicle-mounted camera.

CITATION LIST

Patent Literature

PTL1: JP 2009-280109 A

SUMMARY OF THE INVENTION

The technique described in PTL 1 poses a problem in that other sensors are separately needed to select images which need to be recorded.

An aspect of the present disclosure can desirably provide a drive recorder that enables selective recording of images using a simple configuration.

A drive recorder as an aspect of the present disclosure includes a moving object detecting unit and a temporary recording control unit. The moving object detecting unit detects a moving object in a captured image acquired by an image acquiring unit mounted on an own vehicle, which is a vehicle equipped with the drive recorder. The image acquiring unit includes a plurality of cameras capturing images around the own vehicle. The temporary recording control unit selects, as a temporary recording camera, one or more cameras which are included in the plurality of cameras constituting the image acquiring unit and which include a target camera that includes a position of the moving object within an image capturing range of the camera, according to a detection result from the moving object detecting unit, and the temporary recording control unit records an image captured by the temporary recording camera in a previously prepared recording medium. The temporary recording control unit is configured to select, as the temporary recording camera, not only the target camera but also a camera having an image capturing area adjacent to the image capturing area of the target camera.

Such a configuration allows selective recording of an image of a moving object present around the own vehicle. Moreover, since only the cameras are needed to be used to select images, and no other separate sensors are needed, the function as described above can be achieved using a simple configuration.

It should be noted that parenthesized reference signs in the claims indicate correspondence with specific means described in embodiments discussed below as one aspect, and are not intended to limit the technical scope of the present disclosure.

DESCRIPTION OF THE EMBODIMENTS

Embodiments of the present disclosure will be described below with reference to the drawings.

1. Configuration

Figure 1:
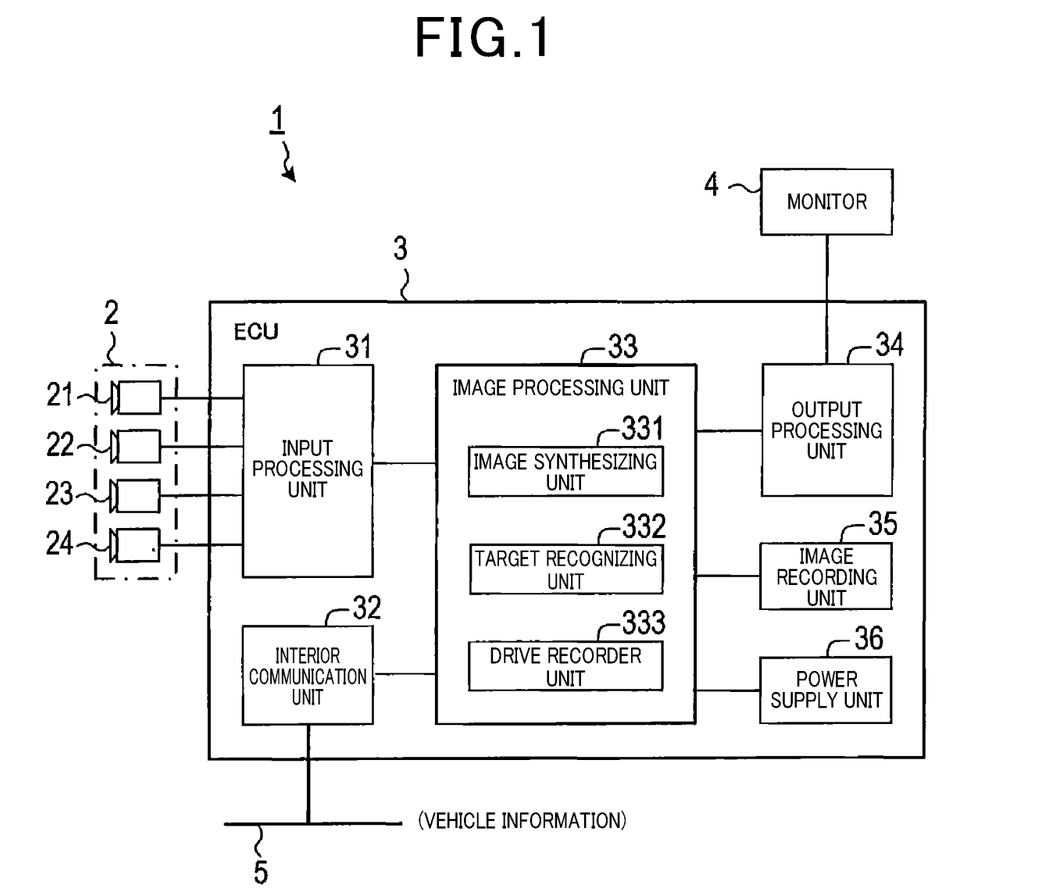
FIG. 1 is a block diagram illustrating a configuration of an image processing system.

An image processing system 1 is mounted on a vehicle such as an automobile. As illustrated in FIG. 1, the image processing system 1 is provided with an image acquiring unit 2, an electronic control unit (hereinafter, ECU) 3, a monitor 4, and an in-vehicle communication network 5. The vehicle equipped with the image processing system 1 is hereinafter referred to as an own vehicle.

Figure 3:
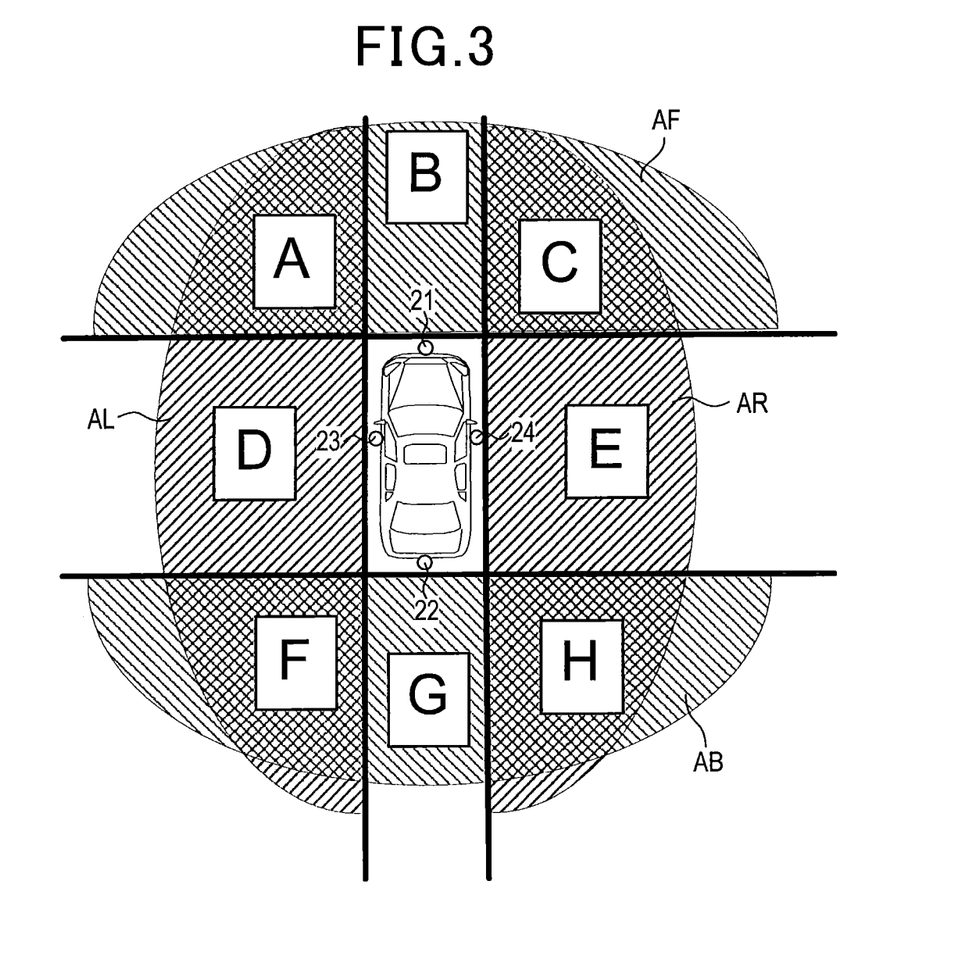
FIG. 3 is a diagram illustrating division areas and image capturing ranges.

The image acquiring unit 2 is provided with a front camera 21, a rear camera 22, a left side camera 23, and a right side camera 24. Each of the cameras 21 to 24 is, for example, a CCD image sensor or a CMOS image sensor. As illustrated in FIG. 3, the front camera 21 is mounted, for example, on a bumper at the front of the vehicle so as to have an image capturing range (hereinafter, front image capturing range) AF ahead of the vehicle. The rear camera 22 is mounted, for example, on a bumper at the rear of the vehicle so as to have an image capturing range (hereinafter, rear image capturing range) AB behind the vehicle. The left side camera 23 is mounted, for example, on a left side mirror so as to have an image capturing range (hereinafter, left image capturing range) AL on the left side of the vehicle. The right side camera 24 is mounted, for example, on a right side mirror so as to have an image capturing range (hereinafter, right image capturing range) AR on the right side of the vehicle. The image capturing ranges illustrated in FIG. 3 are schematic and are actually set to include the minimum ranges needed for various applications utilizing captured images. Each of the cameras 21 to 24 repeatedly captures an image at predetermined time intervals (for example, 1/15 [sec.]), and outputs the captured images to the ECU 3.

The monitor 4 is a display apparatus provided with, for example, a liquid crystal or organic electroluminescent display screen. The monitor 4 displays an image based on a signal received from the ECU 3.

The in-vehicle communication network 5 is, for example, a CAN, and is connected to various types of vehicle-mounted equipment. Note that CAN is a registered trade mark and is an abbreviation for the Controller Area Network.

The ECU 3 is provided with an input processing unit 31, an in-vehicle communication unit 32, an image processing unit 33, an output processing unit 34, an image recording unit 35, and a power supply unit 36.

The input processing unit 31 samples a captured image received from the image acquiring unit 2 to convert the image into a digital signal, and outputs the digital signal to the image processing unit 33.

The in-vehicle communication unit 32 collects vehicle information by communicating, via the in-vehicle communication network 5, with another ECU or the like mounted on the own vehicle. The vehicle information includes a vehicle speed indicative of the speed of the own vehicle and a shift position indicative of the position of a shift lever of the own vehicle.

The output processing unit 34 converts a digital signal of a composite image outputted from the image processing unit 33 into an analog signal, and outputs the analog signal to the monitor 4.

The image storage unit 35 is a storage apparatus provided with a readable and writable non-transitory tangible recording medium. The image storage unit 35 stores captured images acquired from the image acquiring unit 2 and composite images generated by the image processing unit 33.

The power supply unit 36 receives power supplied from a battery (not illustrated) for the own vehicle, appropriately converts the supplied voltage, and supplies the resultant voltage to the units of the ECU 3.

The image processing unit 33 is provided with a microcomputer having a CPU and semiconductor memory (hereinafter, memory) such as RAM, ROM, or flash memory. Various functions are implemented by the image processing unit 33 as a result of the CPU executing programs stored on the non-transitory tangible recording medium. In this example, the memory corresponds to the non-transitory tangible recording medium in which the programs are stored. Furthermore, execution of the programs allows methods corresponding to the programs to be performed. The image processing unit 33 may be provided with one or more microcomputers.

The image processing unit 33 is provided with an image synthesizing unit 331, a target recognizing unit 332, and a drive recorder unit 333, which are functions implemented as a result of the CPU executing programs. These elements included in the image processing unit 33 are not intended to be implemented exclusively by software, but some or all of the elements may be implemented using hardware with a combination of logic circuits, analog circuits, and the like.

The image synthesizing unit 331 is activated in response to an external instruction. Based on captured images acquired from the cameras 21 to 24 via the input processing unit 31, the activated image generating unit 331 converts the captured images into bird's eye views from a predetermined virtual viewpoint and synthesizes the bird's eye views to generate a bird's eye view image. Moreover, the image synthesizing unit 33 outputs the generated bird's eye view image to the monitor 4 via the output processing unit 34 to display the bird's eye view image on the monitor 4, and records the bird's eye view image in the image storage unit 35. Processing for generating a bird's eye view image from captured images is well known, and thus, detailed description thereof is omitted.

The target recognizing unit 332 continues to operate while the image processing unit 33 is being supplied with power from the power supply unit 36. Specifically, based on the captured images acquired from the cameras 21 to 24 via the input processing unit 31, a target is detected that is present within the image capturing range of each of the cameras 21 to 24, and target information on the target is generated. The target information includes at least the position of the target, the direction of movement of the target, and the speed of movement of the target. Processing for detecting a target in the captured images and generating target information on the target is well known, and thus, detailed description thereof is omitted.

The drive recorder unit 333 executes image recording processing for selectively recording the captured images acquired from the cameras 21 to 24 via the input processing unit 31, in the image recording unit 35 in accordance with a predetermined rule.

2. Processing

Figure 2:
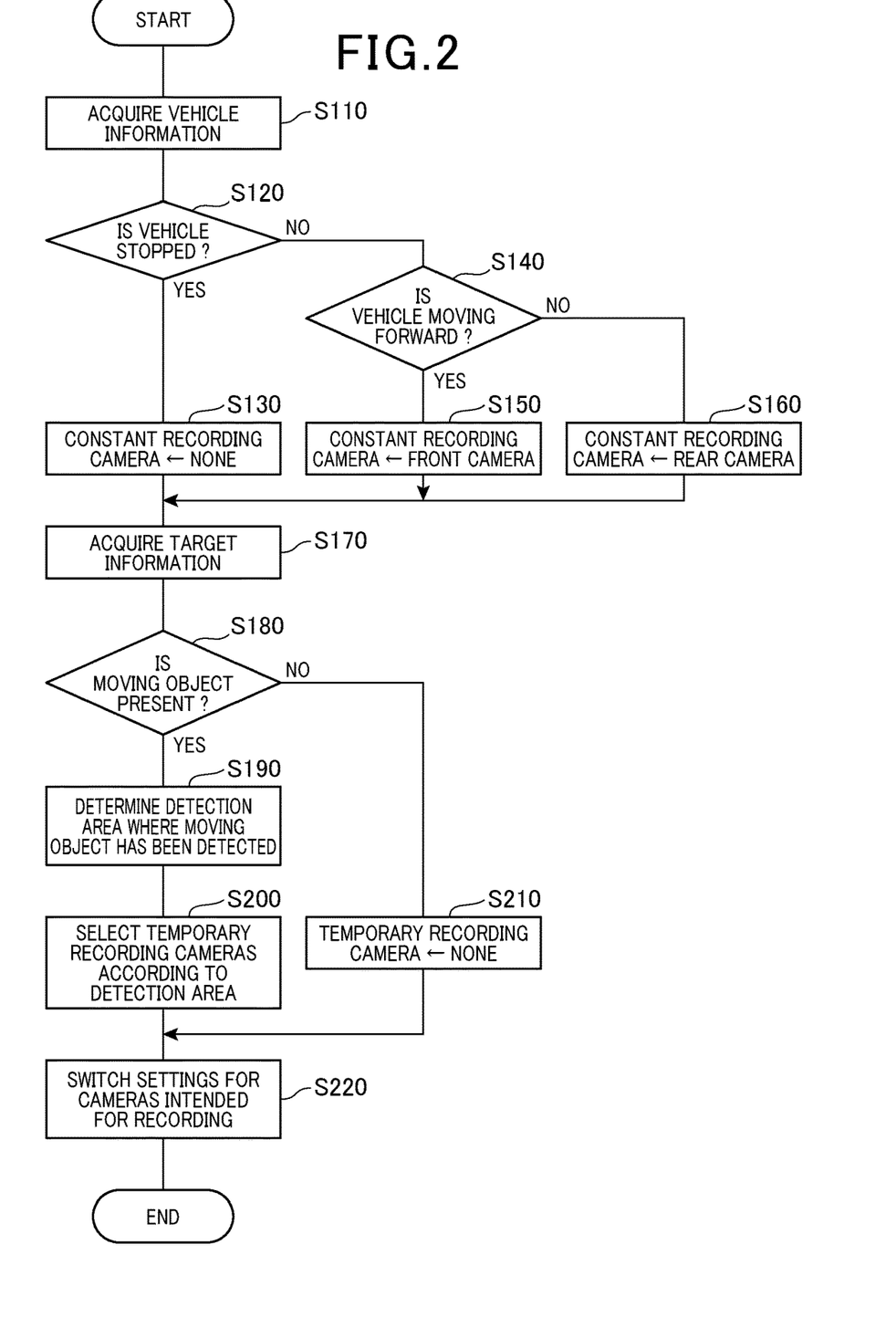
FIG. 2 is a flowchart for image recording processing.

The image recording processing executed by the drive recorder unit 333 will now be described using a flowchart in FIG. 2. The present processing is periodically initiated at predetermined time intervals. Furthermore, a camera selection table described below is pre-stored in the memory included in the image processing unit 33.

When the present processing is initiated, the CPU, functioning as the drive recorder unit 333, acquires vehicle information on the own vehicle via the in-vehicle communication unit 32 at S110.

At S120, the CPU determines whether the own vehicle is stopped based on the vehicle information acquired at S110. Here, if the shift lever is in a neutral position or a park position and the vehicle speed is zero, then the own vehicle is determined to be stopped. The CPU proceeds to S130 if it is determined that the own vehicle is stopped, and proceeds to S140 if it is determined that the own vehicle is not stopped.

At S130, the CPU makes settings indicating that none of the cameras are to be selected as a constant recording camera, and proceeds to S170. The constant recording camera refers to a camera for which captured images need to be constantly recorded.

At S140, based on the vehicle information acquired at S110, the CPU determines whether the own vehicle is moving forward. Here, if the shift position is within a forward range or the vehicle speed has a positive value, then the own vehicle is determined to be moving forward. The CPU proceeds to S150 if it is determined that the own vehicle is moving forward, and proceeds to S160 if it is determined that the own vehicle is not moving forward.

At S150, the CPU selects the front camera 21 as the constant recording camera and proceeds to S170.

At S160, the CPU selects the rear camera 22 as the constant recording camera and proceeds to S170.

At S170, the CPU acquires target information generated by the target recognizing unit 332.

At S180, based on the target information acquired at S170, the CPU determines whether any moving object is present. Specifically, a target for which target information includes the speed of movement of greater than zero is determined to be a moving object. If it is determined that no moving object is present, the CPU proceeds to S210 to make settings indicating that none of the cameras are to be selected as a temporary recording camera. The temporary recording camera refers to a camera for which captured images need to be recorded depending on the situation. If it is determined that a moving object is present, the CPU proceeds to S190.

At S190, based on positional information included in the target information, the CPU determines which of a plurality of division areas into which the surrounding area of the own vehicle is divided corresponds to an area where the moving object has been detected. As illustrated in FIG. 3, the division areas refer to nine areas except one in which the own vehicle is present, that is, eight areas A to H; the nine areas are separated by two straight lines extended in a vehicle width direction along a front end surface and a rear end surface of the own vehicle and two straight lines extended in a vehicle length direction along a left end surface and a right end surface of the own vehicle. The division areas A, B, C belong to the image capturing area AF of the front camera 21. The division areas F, G, H belong to the image capturing area AB of the rear camera 22. The division areas A, D, F belong to the image capturing area AL of the left side camera 23. The division areas C, E, F belong to the image capturing area AR of the right side camera 24.

Figure 4:
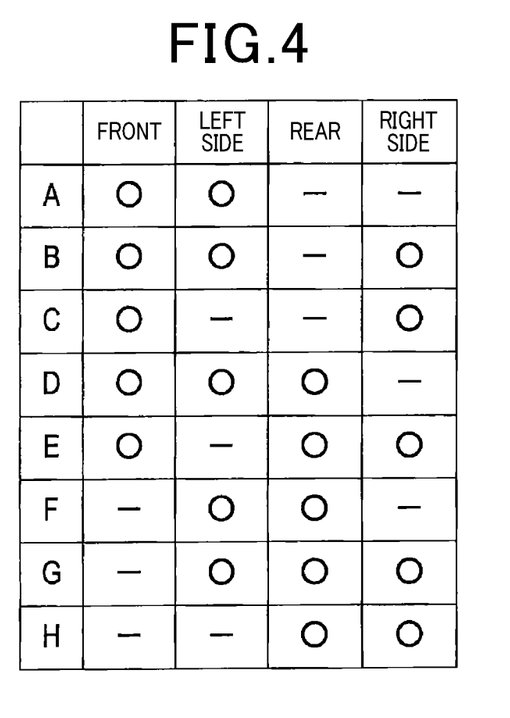
FIG. 4 is a diagram illustrating an example of settings in a camera selection table.

At S200, the CPU uses the camera selection table to select, as the temporary recording cameras, cameras associated with the detection area determined at S190 and in which the moving object has been detected, and then proceeds to S220. The camera selection table is set, for example, as illustrated in FIG. 4. That is, if the area where the moving object has been detected is one of the division areas A, C, F, H, two cameras are selected which correspond to two image capturing areas to which that division area belongs. If the area where the moving object has been detected is one of the division areas B, D, E, G, a total of three cameras are selected which correspond to one image capturing area to which that division area belongs and two areas adjacent to the image capturing area.

At S220, the CPU sets captured images from the cameras selected as the constant recording camera and the temporary recording cameras so that the captured images are to be recorded in the image recording unit 35, and ends the present processing. In other words, although all of the cameras 21 to 24 constantly output captured images, only captured images from cameras selected as the constant recording camera and the temporary recording cameras are recorded in the image recording unit 35. The camera selected as the constant recording camera is varied depending on whether the vehicle is moving forward. The cameras selected as the temporary recording cameras are varied according to the area where the moving object has been detected.

3. Operation Example

Figure 5:
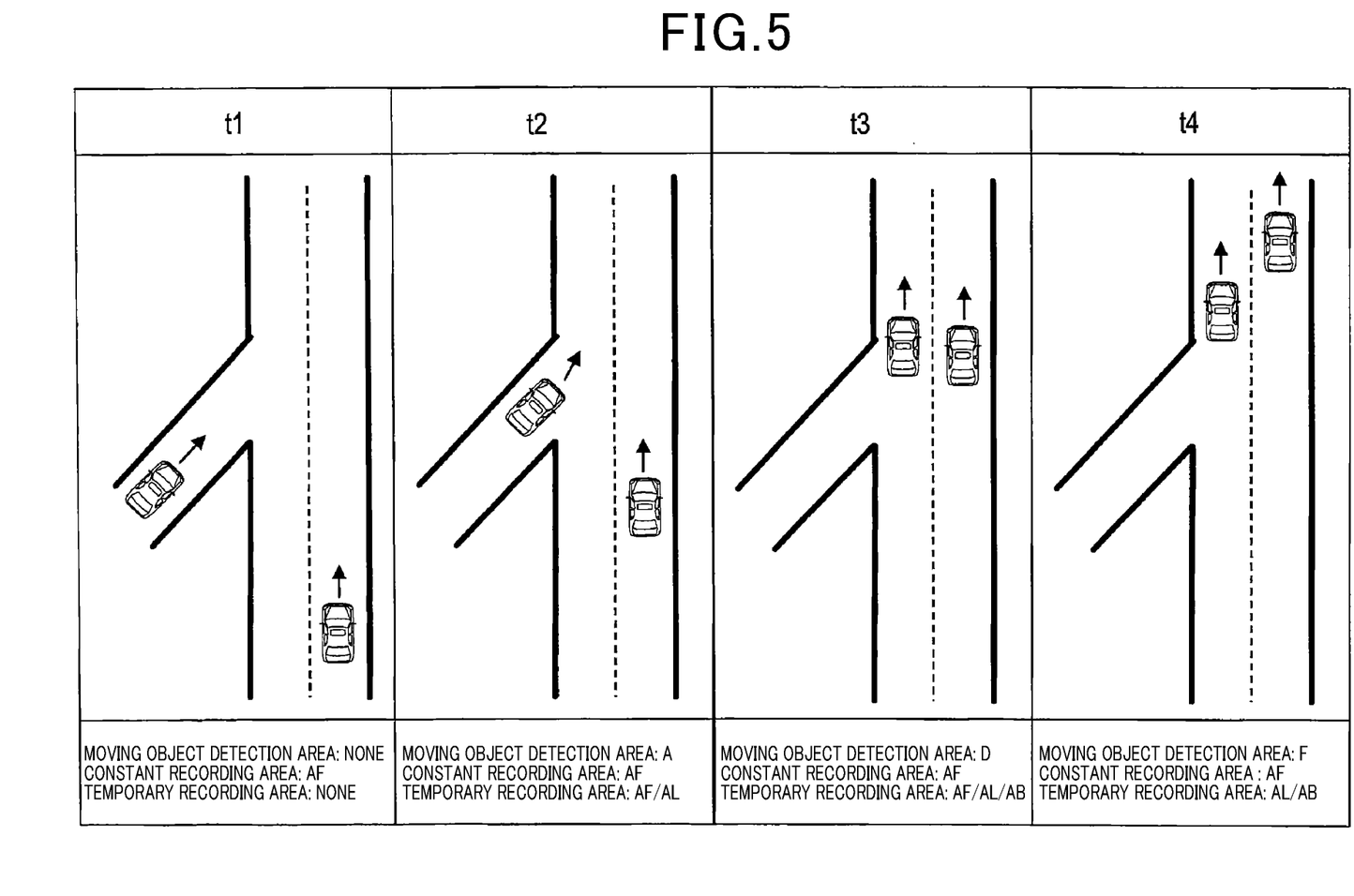
FIG. 5 is a diagram illustrating an example of operations performed by a drive recorder unit.

For example, a situation where a vehicle is merging into a main lane at an interchange or the like, while the own vehicle is traveling on an expressway or the like is assumed as illustrated in FIG. 5. The image capturing area of the constant recording camera is hereinafter also referred to as a constant recording area. The image capturing area of the temporary recording camera is hereinafter also referred to as a temporary recording area.

In this situation, since the own vehicle is moving forward, the front camera 21 serves as the constant recording camera, that is, the image capturing area AF serves as the constant recording area.

At time t1, the merging vehicle is traveling away from the own vehicle, and thus, no moving object is detected in any of the division areas A to H, with none of the cameras selected as the temporary recording cameras. Therefore, only the captured image of the constant recording area AF is recorded in the image recording unit 35.

At time t2, when the merging vehicle, traveling in front and on the left of a sensing range of the own vehicle, is entering the main lane, the moving object is detected in the division area A, and thus, the front camera 21 and the left side camera 23 are selected as the temporary recording cameras. Therefore, the captured images of the areas AF, AL corresponding to merger of the constant recording area AF and the temporary recording areas AF, AL are recorded in the image recording unit 35.

At time t3, when the own vehicle is traveling side-by-side with the merging vehicle, having entered the main lane, the moving object is detected in the division area D, and thus, the front camera 21, the left side camera 23, and the rear camera 22 are selected as the temporary recording cameras. Therefore, the captured images of the areas AF, AL, AB corresponding to merger of the constant recording area AF and the temporary recording areas AF, AL, AB are recorded in the image recording unit 35.

At time t4, when the own vehicle has passed the merged vehicle, the left side camera 23 and the rear camera 22 are selected as the temporary recording cameras. Therefore, the captured images of the areas AF, AL, AB corresponding to merger of the constant recording area AF and the temporary recording areas AL, AB are recorded in the image recording unit 35.

4. Effects

As described above in detail, in the image processing system 1, the drive recorder unit 333 selects, as the temporary recording cameras, those cameras which are included in the plurality of cameras 21 to 24 included in the image acquiring unit 2 and which have captured or may capture an image of the moving object present around the own vehicle. Then, captured images from the selected temporary recording cameras are recorded. Thus, compared to a configuration which records the captured images from all of the cameras, the present configuration reduces the storage capacity of the image recording unit 35 needed for recording of the captured images. Furthermore, with the same storage capacity, the present configuration enables longer recording time. Moreover, since only the cameras are needed to be used to select images, and no other separate sensors are needed, the function as described above can be achieved using a simple configuration.

The drive recorder corresponds to the target recognizing unit 332 and the drive recorder unit 333 in the image processing unit 33.

5. Other Embodiments

The embodiment of the present disclosure has been described. However, the present disclosure is not limited to the above-described embodiment, and many variations may be made to the embodiment.

Figure 6:
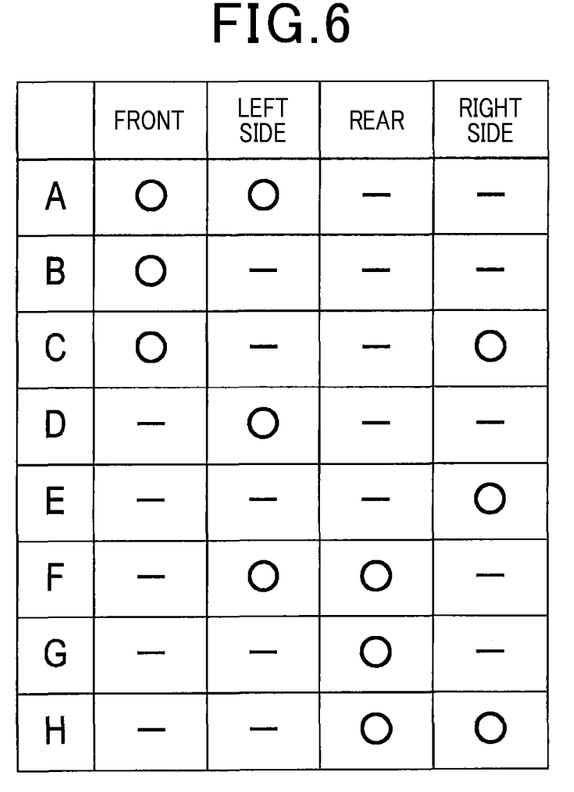
FIG. 6 is a diagram illustrating an example of other settings in the camera selection table.

(a) In the above-described embodiment, the temporary recording cameras selected for the division areas B, D, E, G, include not only the camera (hereinafter, target camera) corresponding to the image capturing area to which the division area where the moving object has been detected belongs but also the cameras corresponding to the image capturing areas adjacent to the above-described image capturing area. However, the present disclosure is not limited to this. For example, as illustrated in FIG. 6, only the target camera may be selected as the temporary recording camera.

(b) In the above-described embodiment, the image acquiring unit 2 is provided with the four cameras 21 to 24, and the surroundings of the vehicle are divided into the eight division areas A to H. However, the present disclosure is not limited to this. The image acquiring unit 2 may be provided with two, three, or five or more cameras. Furthermore, the number of the division areas may be 2 to 7, or 9 or more.

(c) A plurality of functions of one component of the above-described embodiment may be achieved by a plurality of components, or one function of one component may be fulfilled by a plurality of components. Alternatively, a plurality of functions of a plurality of components may be achieved by one component, or one function fulfilled by a plurality of components may be achieved by one component. Furthermore, the configuration of the above-described embodiment may be partly omitted. Moreover, at least a part of the configuration of the above-described embodiment may be added to the configuration of any of the above-described other embodiments or may replace a corresponding part of the latter. The embodiments of the present disclosure correspond to all aspects included in technical concepts specified by the language of the claims.

(d) The present disclosure may be implemented in various forms including a program for causing a computer to function as the drive recorder and a non-transitory tangible recording medium such as a semiconductor memory in which the program is recorded, besides the drive recorder implemented as the functions of the above-described image processing unit 33.

The invention claimed is:

1. A drive recorder comprising:
a moving object detecting unit configured to detect a moving object in a captured image acquired by an image acquiring unit mounted on an own vehicle which is a vehicle equipped with the drive recorder, the image acquiring unit including a plurality of cameras capturing images around the own vehicle; and
a temporary recording control unit configured to
select, as a temporary recording camera, one or more cameras which are included in the plurality of cameras in the image acquiring unit and which include a target camera which is a camera including a position of the moving object within an image capturing range of the camera, according to a detection result from the moving object detecting unit, and
to record an image captured by the temporary recording camera in a previously prepared recording medium, wherein
the temporary recording control unit is configured to dynamically select while the own vehicle is moving, as the temporary recording camera, not only the target camera but also a camera having an image capturing area adjacent to the image capturing area of the target camera.

2. The drive recorder according to claim 1, wherein
the temporary recording control unit is configured to divide an area around the own vehicle into a plurality of areas and to select a camera used as the temporary recording camera depending on which of division areas corresponding to the plurality of areas corresponds to an area where the moving object detected by the moving object detecting unit is positioned.

3. The drive recorder according to claim 1, wherein
the drive recorder further includes a constant recording control unit configured to select a pre-designated camera included in the plurality of cameras in the image acquiring unit, as a constant recording camera, regardless of the detection result from the moving object detecting unit, and to record a captured image from the constant recording camera in the previously prepared recording medium.

4. The drive recorder according to claim 3, wherein
the image acquiring unit includes at least a front camera capturing an image of an area ahead of the own vehicle and a rear camera capturing an image of an area behind the own vehicle, and
the constant recording control unit is configured to select the front camera as the constant recording camera if the own vehicle moves forward and to select the rear camera as the constant recording camera if the own vehicle moves backward.

5. The drive recorder according to claim 2, wherein
each of the plurality of cameras is assigned to at least three areas of the plurality of areas.

6. The drive recorder according to claim 2, wherein
each of the plurality of cameras is assigned to at least five areas of the plurality of areas.

7. The drive recorder according to claim 2, wherein
the temporary recording control unit automatically selects a camera of the plurality of cameras having an image capturing area on each adjacent side to the image capturing area of the target camera based on a particular area of the plurality of areas corresponding to the detection result.

8. The drive recorder according to claim 1, wherein
the plurality of cameras repeatedly capture images at a predetermined time interval.

9. The drive recorder according to claim 1, wherein
the temporary recording control unit automatically selects, as a temporary recording camera, any of the one or more cameras which are included in the plurality of cameras in the image acquiring unit.

10. A drive recorder comprising:
a moving object detecting unit configured to detect a moving object in a captured image acquired by an image acquiring unit mounted on an own vehicle which is a vehicle equipped with the drive recorder, the image acquiring unit including a plurality of cameras capturing images around the own vehicle; and
a temporary recording control unit configured to
select, as a temporary recording camera, one or more cameras which are included in the plurality of cameras in the image acquiring unit and which include a target camera which is a camera including a position of the moving object within an image capturing range of the camera, according to a detection result from the moving object detecting unit, and
to record an image captured by the temporary recording camera in a previously prepared recording medium, wherein
the temporary recording control unit is configured to select, as the temporary recording camera, not only the target camera but also a camera having an image capturing area adjacent to the image capturing area of the target camera,
the cameras selected as the temporary recording cameras are varied automatically according to an area where the moving object has been detected when the own vehicle is moving.

* * * * *